(12) United States Patent
Kang et al.

(10) Patent No.: US 7,055,591 B2
(45) Date of Patent: Jun. 6, 2006

(54) AIR CONDITIONER FOR VEHICLE

(75) Inventors: Sungho Kang, Daejeon-si (KR);
Sangchul Byon, Daejeon-si (KR);
Yongeun Seo, Daejeon-si (KR);
Yongsang Kim, Daejeon-si (KR)

(73) Assignee: Halla Climate Control Corporation,
Daejeon-si (KR)

( * ) Notice: Subject to any disclaimer, the term of this patent is extended or adjusted under 35 U.S.C. 154(b) by 0 days.

(21) Appl. No.: 11/155,265

(22) Filed: Jun. 17, 2005

(65) Prior Publication Data

US 2006/0000595 A1    Jan. 5, 2006

(30) Foreign Application Priority Data

Jun. 18, 2004    (KR) .................... 10-2004-0045400

(51) Int. Cl.
*B60H 1/00* (2006.01)
*B60H 3/00* (2006.01)
*F25B 29/00* (2006.01)

(52) U.S. Cl. .................... 165/203; 165/42; 165/43; 237/12.3 A; 237/12.3 B; 454/160; 454/161; 454/156

(58) Field of Classification Search ............... 165/203, 165/42, 43; 237/12.3 A, 12.3 B; 454/156, 454/160, 161
See application file for complete search history.

(56) References Cited

U.S. PATENT DOCUMENTS 4,434,932 A * 3/1984 Hara et al. .............. 236/49.3
6,397,942 B1 * 6/2002 Ito et al. .................. 165/203
6,983,793 B1 * 1/2006 Zheng et al. ............. 165/203

FOREIGN PATENT DOCUMENTS

| JP | 58133911 A | * | 8/1983 |
| JP | 62125911 A | * | 6/1987 |
| JP | 04118316 A | * | 4/1992 |
| JP | 06024236 A | * | 2/1994 |
| JP | 2000103222 A | * | 4/2000 |
| JP | 2000-168338 | | 6/2000 |
| KR | 10-2001-0059264 A | | 7/2001 |

* cited by examiner

*Primary Examiner*—John K. Ford
(74) *Attorney, Agent, or Firm*—Fulbright & Jaworski L.L.P.

(57) ABSTRACT

The present invention relates to an air conditioner for a vehicle including a front seat air conditioning unit and a rear seat air conditioning unit. The rear seat air conditioning unit has a rear seat air conditioning casing provided with a rear seat evaporator disposed substantially in the horizontal direction to air flow passages therein, with a rear seat heater core disposed on the upper side of the rear seat evaporator, with rear seat vent outlets and rear seat floor outlets disposed on the upper and lower portions of the exit end thereof for discharging the air flowing to the rear seats of the vehicle, with a bypass flow passage formed along the outer side of the rear seat heater core, with an air mixing area portion where the air passed through the rear seat evaporator is mixed with the air passed through the rear seat heater core, with a rear seat partition wall for dividing the air flow passages into two areas, with first rear seat temperature doors disposed between the rear seat evaporator and the rear seat heater core, and second rear seat temperature doors for opening and closing the lower air flow passage of the rear seat heater core.

6 Claims, 10 Drawing Sheets

Fig. 1

PRIOR ART

Fig. 2

PRIOR ART

Fig. 3

PRIOR ART

AIR CONDITIONER FOR VEHICLE

BACKGROUND OF THE INVENTION

This application claims priority from Korean Patent Application NO. 10-2004-0045400 filed Jun. 18, 2004, hereby incorporated by reference.

1. Field of the Invention

The present invention relates to an air conditioner for a vehicle, and more particularly, to an air conditioner for a vehicle that can independently control the temperatures of the front and rear areas and the left and right areas inside the vehicle, especially provided with a front seat air conditioning unit and a rear seat air conditioning unit such that the temperature of air discharged to the upper side portion of the rear seat air conditioning unit is lower than that of air discharged to the lower side portion thereof.

2. Background of the Related Art

Typically, a vehicle is provided with an air conditioner that heats or cools internal and external air to supply or circulate the heated or cooled air to the interior thereof, thereby keeping the air inside the vehicle at an appropriate temperature and making occupants inside the vehicle feel good.

The air conditioner for a vehicle generally includes a cooling device and a heating device. In more detail, the cooling device is constructed such that refrigerants, which are compressed by means of a compressor that is driven by the power of an engine, which are passed through a condenser, an expansion valve and the evaporator, and which flow into the compressor again, are heat-exchanged with the internal and external air introduced by a blower so as to make the air in the interior of the vehicle cool. The heating device is constructed such that the cooling water, which is used to keep the engine cool, is passed through the heater core, and is returned to the engine. Thereafter, the cooling water is heat-exchanged with the internal and external air flowing out by the blower so as to make the air in the interior of the vehicle heated.

In the conventional air conditioner for the vehicle, however, vent outlets and floor outlets that supply the air to the inside of the vehicle are disposed on the front sides of the front seats, which decreasing the cooling and heating efficiencies for the rear seats substantially.

To solve the above-mentioned problems, in addition to the main air conditioner that is mounted in an engine room, a rear air conditioner is provided at the trunk room, which allows the heating and cooling efficiencies for the rear seats to be relatively higher than those when only the main air conditioner is mounted inside the vehicle. However, a substantially large area is occupied to mount such the rear air conditioner in the trunk room, which causes the available size of the trunk room to be much reduced. Also, a duct is extended from the trunk room to the rear seat such that the structure for installation of the rear air conditioner becomes complicated and at the same time the heated air or the cooled air is easily lost, which drastically reduces the heating and cooling efficiencies for the rear seats.

To solve such the above-mentioned problems occurring in the conventional rear air conditioner, there is provided Korean Publication No. 2001-0059264 that is filed by the same applicant as the present invention, in which a main air conditioner is provided with an auxiliary air conditioning unit that is operated independently of the main air conditioner in order to efficiently achieve the cooling and heating for the rear seats.

Figure 1:
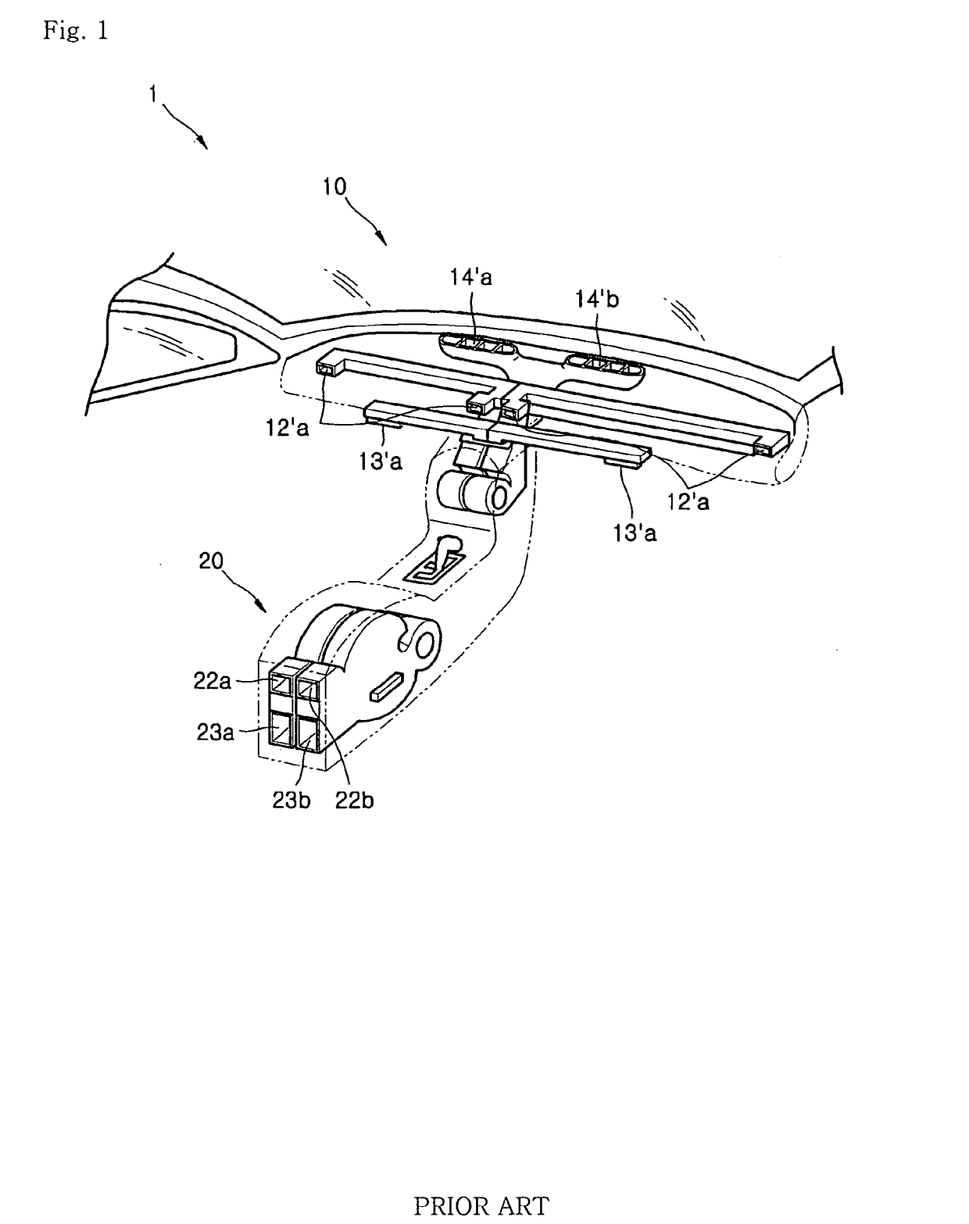
FIG. 1 is a schematic perspective view of showing a conventional air conditioner for a vehicle.
Figure 2:
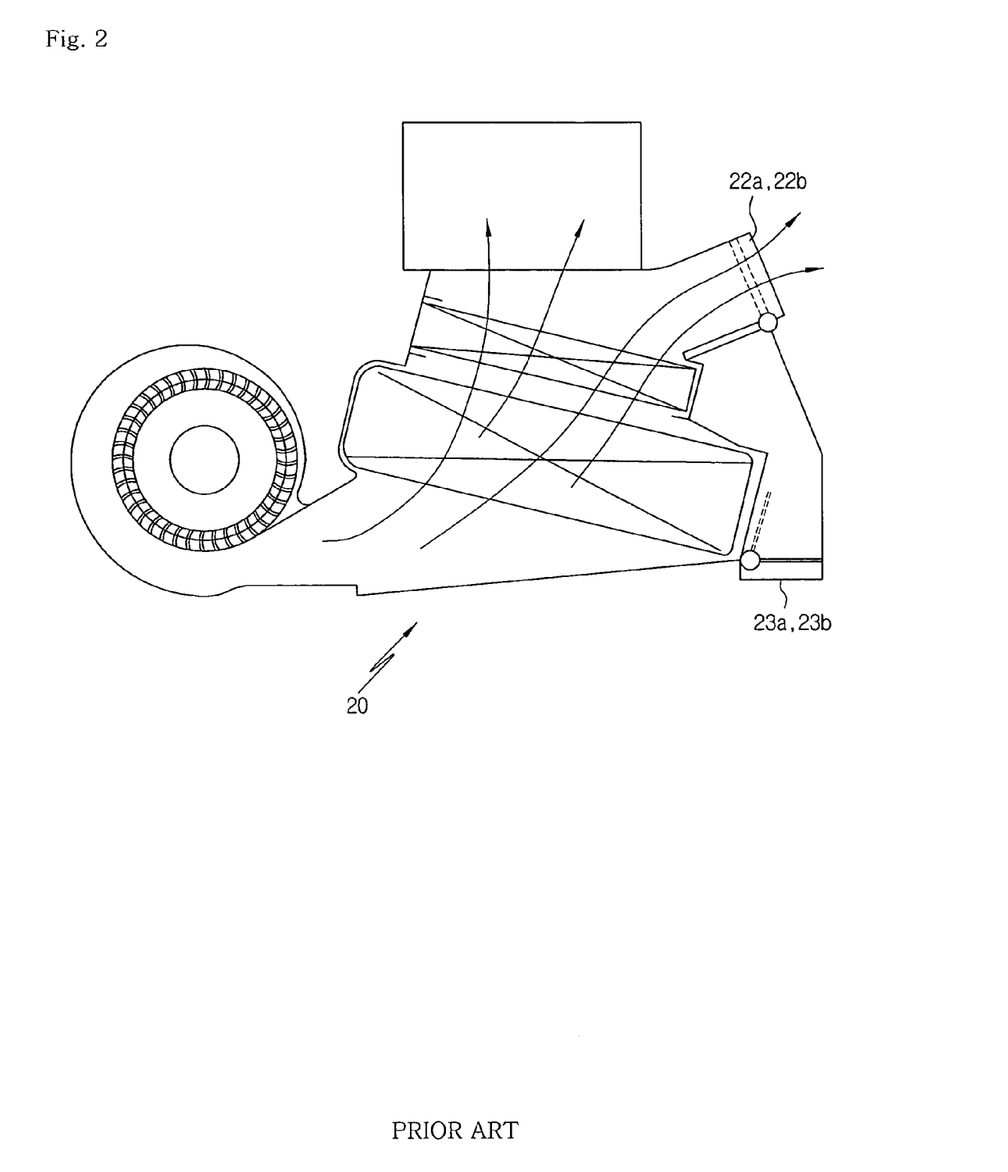
FIG. 2 is a sectional view of showing an auxiliary air conditioner used for the conventional air conditioner for the vehicle.

FIG. 1 is a schematic perspective view of showing a conventional air conditioner 1 for a vehicle provided with a main air conditioner 10 and an auxiliary air conditioner 20 therein, and FIG. 2 is a sectional view of showing the auxiliary air conditioner 20. As shown, the main air conditioner 10 blows air through wind shield openings 14'a and 14'b, center and side openings 12'a and 12'b, and floor openings 13'a and 1'b, and the auxiliary air conditioner 20 blows air through vent outlets 22a hand 22b and floor outlets 23a and 23b.

According to the prior art, the auxiliary air conditioner 20 includes an auxiliary evaporator and an auxiliary heater core, and in this case, respective working fluids that are passed through the auxiliary evaporator and the auxiliary heater core are supplied from the main air conditioner.

In the conventional auxiliary air conditioner, however, the auxiliary heater core is not separated by a predetermined distance from the inner surface of a casing for the auxiliary air conditioner such that the air flowing out from the auxiliary evaporator is necessarily passed through the auxiliary heater core. This prevents a bi-level mode where the temperatures of air flowing to the vent outlets and the floor outlets are different from being conducted.

If the auxiliary heater core is separated by the predetermined distance from the inner surface of the casing for the auxiliary air conditioner, the bi-level mode is carried out such that the temperatures of air flowing to the vent outlets and the floor outlets are different from each other. In this case, cool air is descended and hot air is ascended by the feature of air convection, such that the warm air in the auxiliary air conditioner flows out through the vent outlets and the cool air therein flows out through the floor outlets. At this time, the relatively high temperature of air is not mixed with the relatively low temperature of air, which provides a high degree of refreshing sense to a user.

Even though a part of air passed through the auxiliary evaporator bypasses the auxiliary heater core and is then discharged to the outlets through the inner side of the casing for the auxiliary air conditioner and another part of the air is discharged to the outlets through the auxiliary heater core, it is not possible to achieve the control of the air flowing in such a manner that relatively cool air is discharged to the vent outlets and relatively warm air is discharged to the floor outlets.

According to the prior art, in addition, the auxiliary air conditioner for the rear seats inside the vehicle is not allowed to drive individually the left and right areas for the rear seats, thereby making it impossible to have a multi-zone type of air conditioner where the control of the temperatures for the left and right areas is conducted successfully. To obtain the multi-zone type of air conditioner, preferably, the auxiliary air conditioner has to be mounted for the left and right areas, respectively. This of course causes the number of parts and production processes to be considerably increased to make the production costs greatly high. This also causes the whole installation space of the air conditioner to be substantially enlarged, which prevents the equipment from being compact and keeps the working efficiencies for the installation of the equipment from being improved.

Figure 3:
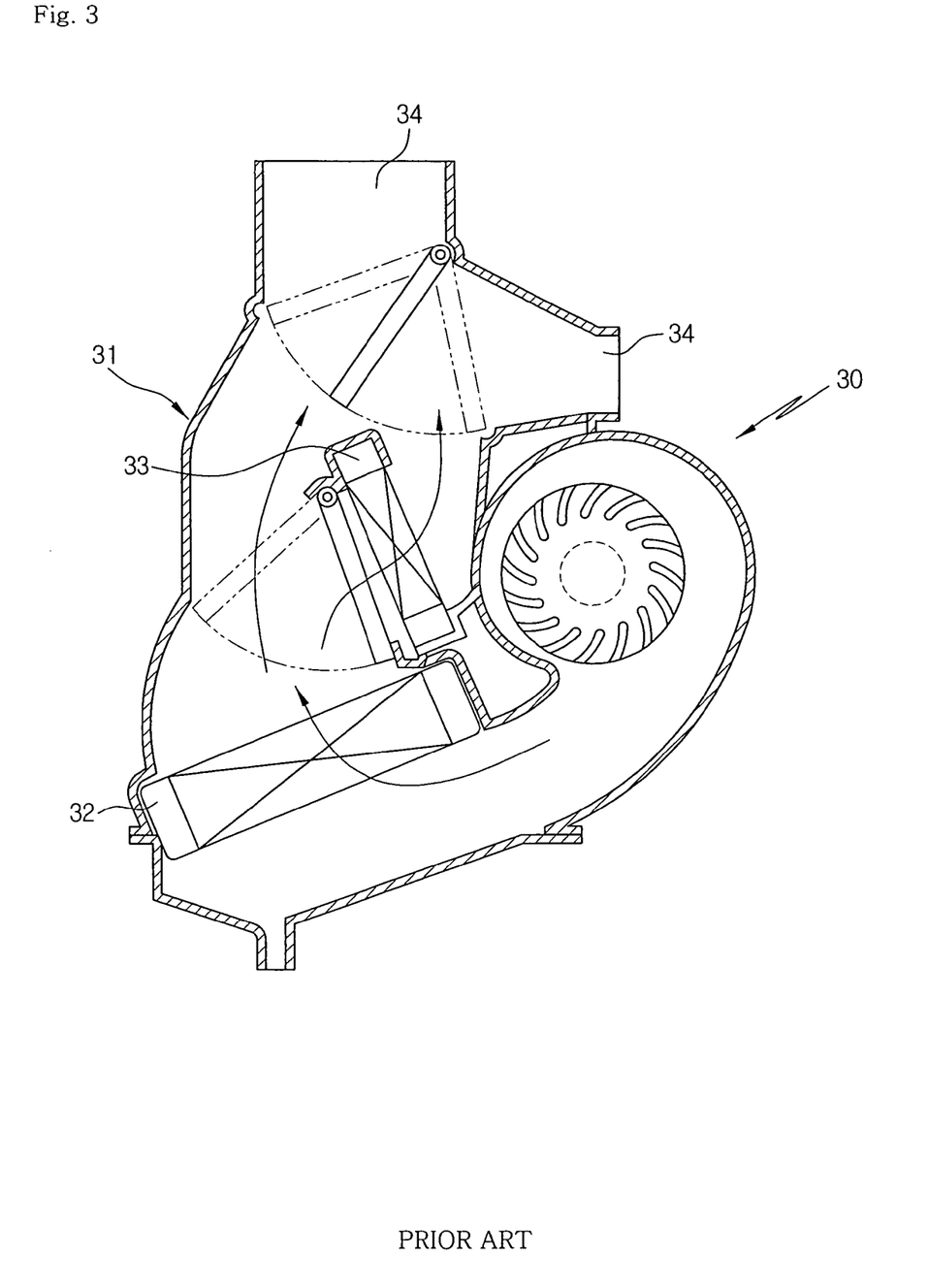
FIG. 3 is a sectional view of showing another auxiliary air conditioner for the conventional air conditioner for the vehicle.

Another conventional auxiliary air conditioner is disclosed in Japanese Patent Laid-Open Publication No. 2000-168338 as shown in FIG. 3, wherein an auxiliary air conditioner 30 serves to provide an appropriate temperature difference between the air flowing to the vent outlets and the air flowing to the floor outlets. However, the auxiliary air conditioner 30 does not have any space portion where the air that is passed through the evaporator 32 and the air that is passed through the heater core 33 are mixed sufficiently before supplying to the outlet 34, such that a cool air guiding means and a warm air guiding means should be formed in the auxiliary air conditioner casing 31. This makes the shape of the casing 31 more complicated. Also this makes it difficult to control the temperature of the discharging air and to control individually the temperatures of the left and right areas.

SUMMARY OF THE INVENTION

Accordingly, the present invention has been made in view of the above-mentioned problems occurring in the prior art, and it is an object of the present invention to provide an air conditioner for a vehicle that can control air flows such that cool air is discharged to upper side portions of front and rear seats and warm air is discharged to lower side portions thereof.

Another object of the present invention is to provide an air conditioner for a vehicle that is constructed such that the independent control of modes and temperatures of the left and right areas of each of the front and rear seats is carried out.

Still another object of the present invention is to provide a multi-zone type air conditioner for a vehicle that can independently control the air temperatures of the left and right areas of each of the front and rear, that enables the shape of the air conditioner to be more compacted, and that conduct the control of various kinds of modes by using rear seat mode doors mounted in divided two areas.

To accomplish the above objects, according to the present invention, there is provided an air conditioner for a vehicle including: a front seat air conditioning unit having a front seat air conditioning casing provided with a front seat evaporator and a front seat heater core disposed on air flow passages therein, with front seat vent outlets, front seat defrost outlets and front seat floor outlets disposed at an exit end thereof for discharging the air flowing to the front seats of the vehicle, with a front seat partition wall for dividing the air flow passages into two areas, with front seat temperature doors for individually controlling the temperatures for the two areas divided by the front seat partition wall, with front seat mode doors for controlling the degree of opening of the front seat vent outlets, the front seat defrost outlets and the front seat floor outlets, and with the front seat blower for blowing the air to the front seat air conditioning casing; and a rear seat air conditioning unit having a rear seat air conditioning casing provided with a rear seat evaporator disposed substantially in the horizontal direction to air flow passages therein, with a rear seat heater core disposed on the upper side of the rear seat evaporator, with rear seat vent outlets and rear seat floor outlets disposed at an exit end thereof for discharging the air flowing to the rear seats inside the vehicle, with a bypass flow passage formed along the outer side of the rear seat heater core for allowing the air to go round the outer side of the rear seat heater core, with an air mixing area portion where the air passed through the rear seat evaporator is mixed with the air passed through the rear seat heater core, with a rear seat partition wall for dividing the air flow passages into two areas, with first rear seat temperature doors disposed between the rear seat evaporator and the rear seat heater core for opening and closing the upper air flowing passage of the rear seat heater core and the bypass flow passage and for independently controlling the temperatures for the two areas divided by the rear seat partition wall, and second rear seat temperature doors for opening and closing the lower air flow passage of the rear seat heater core, with rear seat mode doors for controlling the degree of opening of the rear seat vent outlets and the rear seat floor outlets, and with a rear seat blower for blowing the air to the rear seat air conditioning casing.

The rear seat blower is desirable to be disposed between the rear seat evaporator/the rear seat heater core at one side thereof and the rear seat vent outlets/the rear seat floor outlets at the other side thereof.

In this case, the rear seat evaporator and the rear seat heater core are desirable to be disposed substantially in the horizontal direction at the one side of the rear seat blower.

The degree of opening of the rear seat vent outlets and the rear seat floor outlets of the rear seat air conditioning casing is desirably controlled by means of the rear seat mode doors mounted in the divided two areas.

The rear seat blower is formed at one side thereof protrudingly inwardly from the rear seat air conditioning casing to compart the air mixing area portion.

The second rear seat temperature doors are adapted to separate the warm air that is passed through the rear seat heater core and the cool air that bypasses the rear seat heater core in response to the control of the degree of opening thereof or to mix the warm air and the cool air in the air mixing area portion to supply the mixed air to the rear seat vent outlets and the rear seat floor outlets.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

According to the present invention, an air conditioner 100 for a vehicle includes a front seat air conditioning unit 101 and a rear seat air conditioning unit 201.

Figure 4:
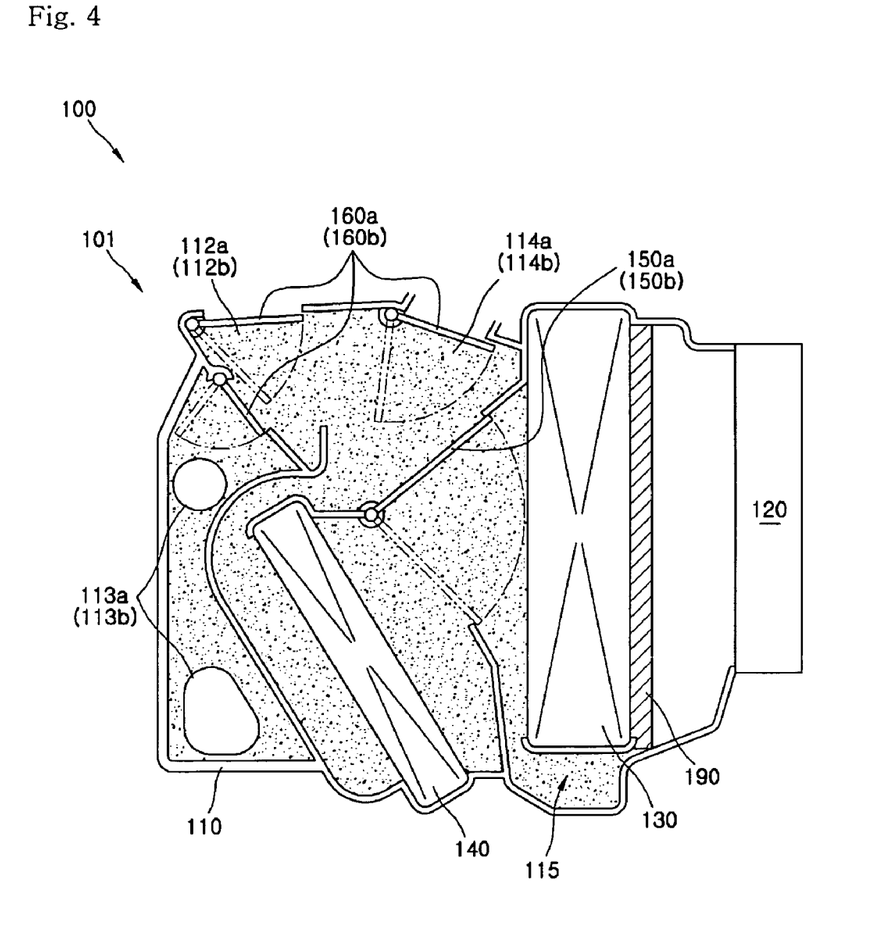
FIG. 4 is a schematic sectional view of showing a front seat air conditioning unit of the air conditioner for a vehicle constructed according to an embodiment of the present invention.

FIG. 4 depicts the front seat air conditioning unit 101 of the air conditioner 100 for a vehicle constructed according to a preferred embodiment of the present invention.

As shown, the front seat air conditioning unit 101 in the air conditioner 100 for the vehicle of the present invention includes a front seat air conditioning casing 110 provided with outlets that discharge air to the front seats and to the inside of the wind shield of the vehicle and a front seat blower 120 that blows air to the front seat air conditioning casing 110.

The front seat air conditioning casing 110 is provided at the downstream of the air flow passage blown from the front seat blower 120 with a front seat evaporator 130 for cooling the blown air and with a front seat heater core 140 for heating the blown air.

The front seat air conditioning casing 110 is also provided with front seat vent outlets 112a and 112b that are extended to the left and right sides of the front seats and to the center portion of the front seats, with front seat defrost outlets 114a and 114b that are extended to wind shield openings formed toward a wind shield, and with front seat floor outlets 113a and 113b that are extended to floor openings, wherein the air that is passed through the front seat evaporator 130 and/or the front seat heater core 140 is discharged through the outlets. Also, in the process where the air blown through the front seat blower 120 is passed through the front seat evaporator 130 and the front seat heater core 140, the temperature of the flowing air is controlled by means of front seat temperature doors 150a and 150b, and the outlets of air are selectively determined by means of front seat mode doors 160a and 160b.

Air flow passage 115 that are formed by the front seat air conditioning casing 110 are divided into two areas by means of a front seat partition wall 190, wherein the divided two areas are individually controlled. In other words, the front seat temperature doors 150a and 150b and the front seat mode doors 160a and 160b are disposed in the left and right areas divided by means of the front seat partition wall 190 and controlled individually, interposing the front seat partition wall 190 therebetween. Also, the front seat temperature doors 150a and 150b and the front seat mode doors 160a and 160b are turned through respective driving means (which are not shown), such that the front seats inside the vehicle are controlled to have temperatures of the left and right areas different from each other and to have modes of the left and right areas different from each other, for example to have the front seat defrost mode set to the left area and to have the front seat floor mode set to the right area.

Figure 5:
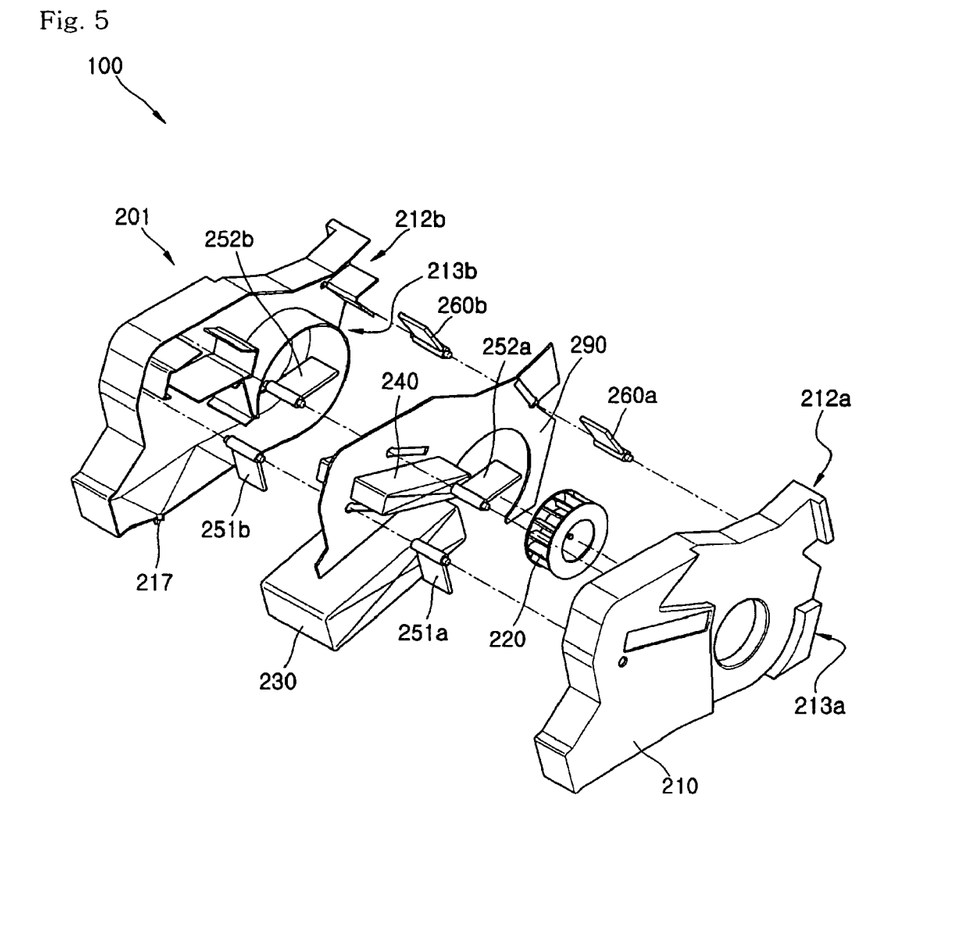
FIG. 5 is an exploded perspective view of showing a rear seat air conditioning unit of the air conditioner for a vehicle constructed according to the embodiment of the present invention.
Figure 6:
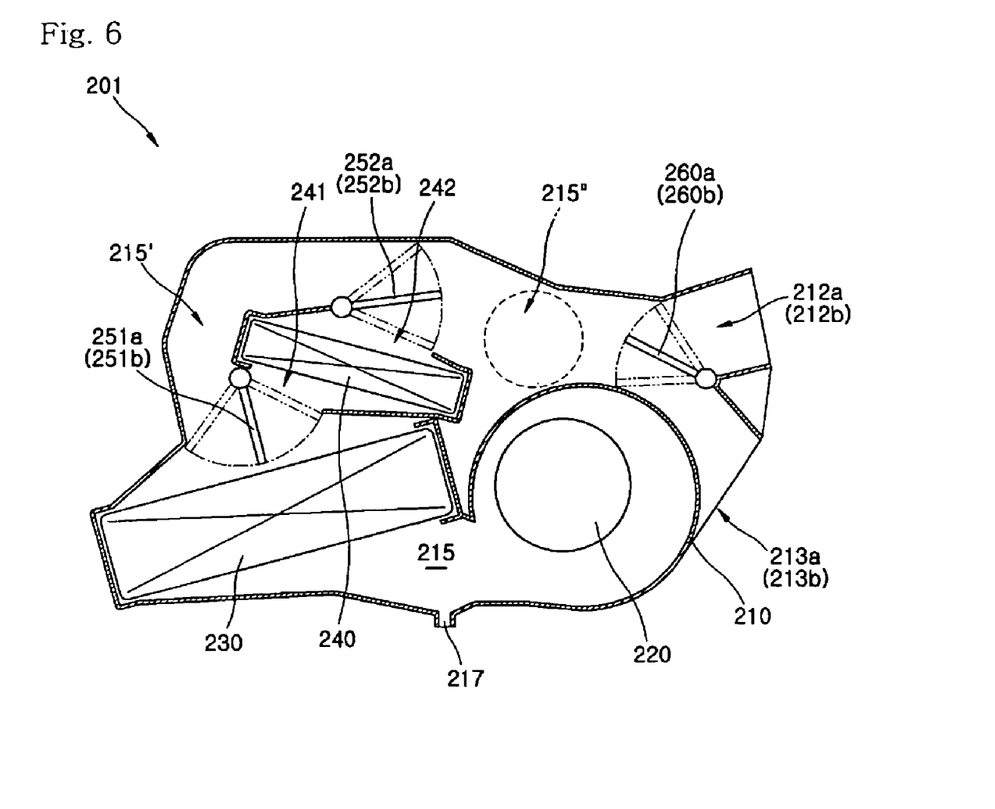
FIG. 6 is a sectional view of showing the rear seat air conditioning unit in one divided area in FIG. 5.

FIG. 5 is an exploded perspective view of showing the rear seat air conditioning unit 201 of the air conditioner 100 for a vehicle constructed according to the embodiment of the present invention, and FIG. 6 is a sectional view of showing the rear seat air conditioning unit 201 in the left or right side with respect to a rear seat partition wall. As shown in FIGS. 5 and 6, the rear seat air conditioning unit 201 is mounted on an arm rest or at the lower portion of a console box between the left and right front seats, so as to enable the space inside the vehicle, especially the space of rear seats and trunk, to be more enlarged.

The rear seat air conditioning unit 201 is provided with a rear seat air conditioning casing 210 in which a plurality of air flow passages are formed to flow the air supplied thereto to the inside thereof.

The rear seat air conditioning casing 210 has a rear seat blower 220 internally mounted at the inlet side thereof and has rear seat vent outlets 212a and 212b and rear seat floor outlets 213a and 213b formed at the outlet side thereof. The rear seat air conditioning casing 210 is provided with the rear seat partition wall 290 that divides the air flow passages into two areas, that is, left and right areas.

The rear seat blower 220 is embodied with a variety of blowers, desirably with that having air flow inlets formed at the both sides thereof, i.e., left and right sides thereof to prevent the generation of vibration due to the operation concentrated only to any one side and to facilitate gentle air suction.

The rear seat blower 220 is provided at the downstream thereof with a rear seat evaporator 230 that serves to reduce the content of water contained in the air discharged from the rear seat blower 220 to make the moisture in the air lowered. The rear seat evaporator 230 is located horizontally.

The rear seat blower 220 is further provided at the downstream thereof with a rear seat heater core 240 that is disposed under the rear seat evaporator 230.

If the cooling device operates, a working fluid flows to the inside of the rear seat evaporator 230, and the air passing through the rear seat evaporator 230 is heat-exchanged with the working fluid and thus cooled. On the other hand, if the cooling device does not operate, the rear seat evaporator 230 does not operate such that the air passing through the rear seat evaporator 230 is not cooled.

The working fluid, i.e., cooling water flows to the inside of the rear seat heater core 240, and the air passing through the rear seat heater core 240 is heat-exchanged with the cooling water and thus heated. Between the outer side of the rear seat heater core and the inner wall of the rear seat air conditioning casing is provided a bypass flow passage 215' for allowing the air to go round the outer side of the rear seat heater core 240.

The rear seat partition wall 290 is disposed at the central portion of the air flow passages in the rear seat air conditioning casing 210 to thereby divide the left and right sides of the rear seat air conditioning casing 210 such that the left and right areas are defined thereby. The rear seat partition wall 290 is formed such that the air in the left area of the rear seat air conditioning casing 210 is not mixed at all with the air in the right area thereof. Thereby it is possible to flow the air discharged to the left and right areas of the rear seats in different modes, independently of each other.

The rear seat air conditioning casing 210 is provided at the inside thereof with first rear seat temperature doors 251a and 251b, second rear seat temperature doors 252a and 252b, and rear seat mode doors 260a and 260b correspondingly in the left and right areas with respect to the rear seat partition wall 290.

The first rear seat temperature doors 251a and 251b are disposed between the rear seat evaporator 230 and the rear seat heater core 240 to open and close an upstream area portion 241 of the rear seat heater core 240 and the bypass flow passage 215' such that the air passed through the rear seat evaporator 230 is guided to the rear seat heater core 240 or guided to go round to the rear seat heater core 240. Also, the first rear seat temperature doors 251a and 251b serve to individually control the temperatures in the two areas divided by the rear seat partition wall 290.

The second rear seat temperature doors 252a and 252b are disposed in the left and right areas with respect to the rear seat partition wall 290 to open and close a downstream area portion 242 of the rear seat heater core 240.

The rear seat mode doors 260a and 260b are disposed at the upstream of the rear seat vent outlets 212a and 212b placed in the left and right areas with respect to the rear seat partition wall 290. Thus, the rear seat mode doors 260a and 260b can independently open and close the air flow passages connected to the rear seat vent outlets 212a and 212b and to the rear seat floor outlets 213a and 213b.

The rear seat partition wall 290 is desirably extended from the rear side of the rear seat evaporator 230 to the rear seat floor outlets 213a and 213b, such that the air passed through the rear seat evaporator 230 can flow, having independent temperature and mode in the left and right areas with respect to the rear seat partition wall 290.

The rear seat heater core 240 is located in such a manner that the left and right sides thereof with respect to the rear seat partition wall 290 are separated from the inner wall of the rear seat air conditioning casing 210. The first rear seat temperature doors 251a and 251b desirably serve to guide the air that bypasses the rear seat heater core 240 to the bypass flow passage 215' that is formed by the separation of the rear seat heater core 240 from the rear seat air conditioning casing 210, such that the air that has gone round the rear seat heater core 240 is guided through the bypass flow passage 215' to the upstream of the rear seat heater core 240, thereby allowing the cool air flowing to be discharged to the rear seat vent outlets 212a and 212b.

More particularly, preferably, each of the rear seat evaporator 230 and the rear seat heater core 240 is disposed horizontally in such a manner as to be somewhat inclined at a predetermined angle, being adjacent to the rear seat blower 220 at one end thereof. Thus, the air is gently passed through the rear seat evaporator 230 and the rear seat heater core 240, thereby enabling the resistance of air flow and the generation of noises to be greatly decreased. In addition, as the rear seat evaporator 230 is inclined at the predetermined angle, condensed water can be easily discharged to a condensed water outlet 217 that is formed under the rear seat evaporator 240, thereby preventing the condensed water from flowing to another passages. Moreover, the space portion that is formed between the rear seat evaporator 230 and the rear seat blower 240 is much enlarged such that the air flow can be gently formed, and the bypass flow passage 215' is extended to the upstream of the rear seat heater core 240 such that the cool air is moved to the upper side portion of the rear seat heater core 240 and the heat air is moved to the lower side portion thereof.

Also, the rear seat blower 220 is formed at one side thereof protrudingly inwardly from the rear seat air conditioning casing 210 to define an air mixing area portion 215". The air mixing area portion 215" is desirably formed between the rear seat evaporator 230 and the rear seat mode doors 260a and 260b in such a manner that the air flow passage therein has a generally round shape.

That is, the rear seat evaporator 230 and the rear seat heater core 240 are formed at one side of the rear seat blower 220 in a horizontal direction to the rear seat air conditioning unit 201, and the rear seat vent outlets 212a and 212b and the rear seat floor outlets 213a and 213b are formed at the other side of the rear seat blower 220.

As a result, the volume of the rear seat air conditioning casing 210 is reduced, thereby making the rear seat air conditioning unit 201 substantially compacted, and the rear seat blower 220 serves as a kind of protrusion in the air mixing area portion 215" where the air passing through the rear seat evaporator 230 is mixed with the air passing through the rear seat heater core 240, thereby allowing the mixture of air in the air mixing area portion 215" to be well conducted.

On the other hand, the degree of opening of the rear seat vent outlets 212a and 212b and the rear seat floor outlets 213a and 213b of the rear seat air conditioning casing 210 is desirably controlled by means of the rear seat mode doors 260a and 260b mounted in the divided two areas, thereby achieving respective modes in a simple manner.

The first rear seat temperature doors 251a and 251b that are formed in the left and right areas with respect to the rear seat partition wall 290 are connected desirably to respective driving members in such a manner as to be independently driven by using the driving members. In the same manner as the above, also, the second rear seat temperature doors 252a and 252b and the rear seat mode doors 260a and 260b are connected desirably to respective driving members in such a manner as to be independently driven by using the driving members. Thereby, the temperature and mode of air discharged to the left and right sides of the rear seats inside the vehicle can be independently controlled.

As described above, the temperatures of air of the left and right sides of the front seats inside the vehicle can be independently controlled by using the front seat air conditioning unit 101. Therefore, the temperatures and modes of air of the front and rear areas and the left and right rears inside the vehicle can be independently controlled, thereby successfully providing a four-way zone type air conditioner.

Each of working fluids that is passed through the inside of the rear seat evaporator 230 and the rear seat heater core 240 is supplied desirably from the front seat air conditioning unit 101 disposed in the engine room. As an example, the rear seat evaporator 230 is connected to an auxiliary expansion valve and to a pipe connecting the front seat evaporator and the front seat compressor in the front seat air conditioning unit 101. The auxiliary expansion valve is connected to a solenoid valve that is connected to a pipe connecting a receiver drier and an expansion valve of the front seat air conditioning unit 101. Thus, if the solenoid valve is turned on, the refrigerants flowing to the receiver drier and the expansion valve are sent to the rear seat evaporator 230 through the solenoid valve and the auxiliary expansion valve, and contrarily, if the solenoid valve is turned off, the refrigerants are not sent to the rear seat evaporator 230. And, the rear seat heater core 240 is connected to a water valve in the front seat air conditioning unit. Thus, the supply of cooling water to the rear seat heater core 240 starts or stops in response to the operation of the water valve. By the above methods, the working fluids are supplied from the front seat air conditioning unit to the rear seat evaporator 230 and the rear seat heater core 240 of the rear seat air conditioning unit.

The air flowing from the rear seat air conditioning unit 201 to the rear seats inside the vehicle is discharged in a variety of operation modes such as a vent heating mode, a vent cooling mode, a floor heating mode, a floor cooling mode, a heating bi-level mode, a cooling bi-level mode, an air mixing mode, and a cooling and heating bi-level mode.

Now, an explanation of the operation of the rear seat air conditioning unit 201 adopted in the air conditioner for the vehicle according to the present invention will be given hereinafter in detail with reference to FIGS. 7 and 10.

Figure 7:
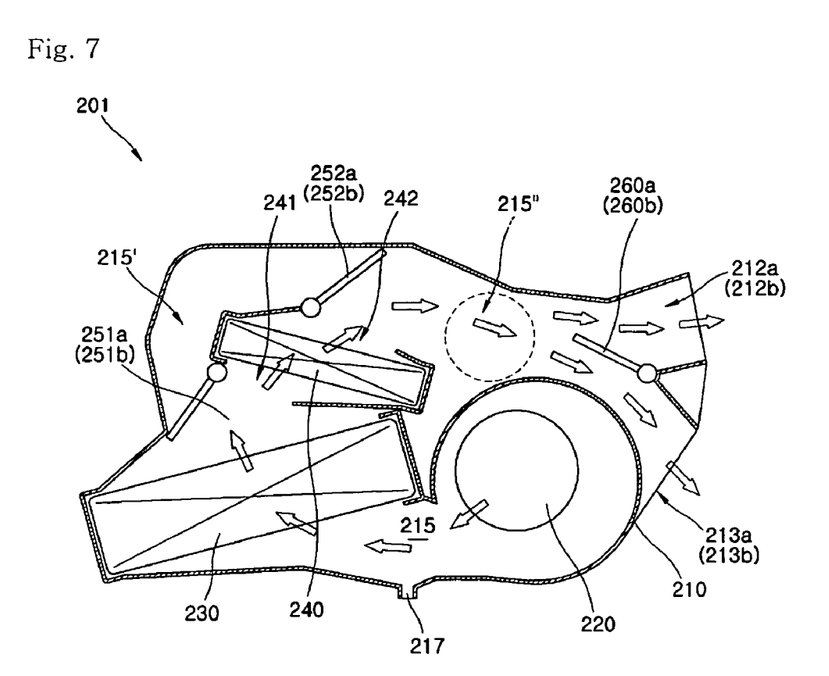
FIG. 7 is a sectional view of showing an air stream in a heating mode in FIG. 6.

FIG. 7 depicts the air stream in the heating mode. In the heating mode since the rear seat evaporator 230 does not operate, the temperature of air passed through the rear seat evaporator 230 is not lowered. At this time, the first rear seat temperature doors 251a and 251b open the upstream area portion 241 of the rear seat heater core 240, closing the bypass flow passage 215'.

Accordingly, the air that is supplied to the inside of the rear seat air conditioning casing 210 by the rear seat blower 220 is not cooled, being passed through the rear seat evaporator 230, and finally heated, being passed through the rear seat heater core 240 by the guide of the first rear seat temperature doors 251a and 251b. Next, the air is sent to the air mixing area portion 215" by the guide of the second rear seat temperature doors 252a and 252b.

In this case, the vent heating mode where air is discharged only to the rear seat vent outlets 212a and 212b is conducted in such a manner that the rear seat mode doors 260a and 260b formed at the upstream of the rear seat vent outlets 212a and 212b are operated to completely close the air flow passage formed to the rear seat floor outlets 213a and 213b. The floor heating mode is conducted in such a manner that the rear seat mode doors 260a and 260b are operated to completely close the air flow passage formed to the rear seat vent outlets 212a and 212b. Furthermore, the heating bi-level mode is conducted in such a manner that the rear seat mode doors 260a and 260b are not fully opened or closed.

Figure 8:
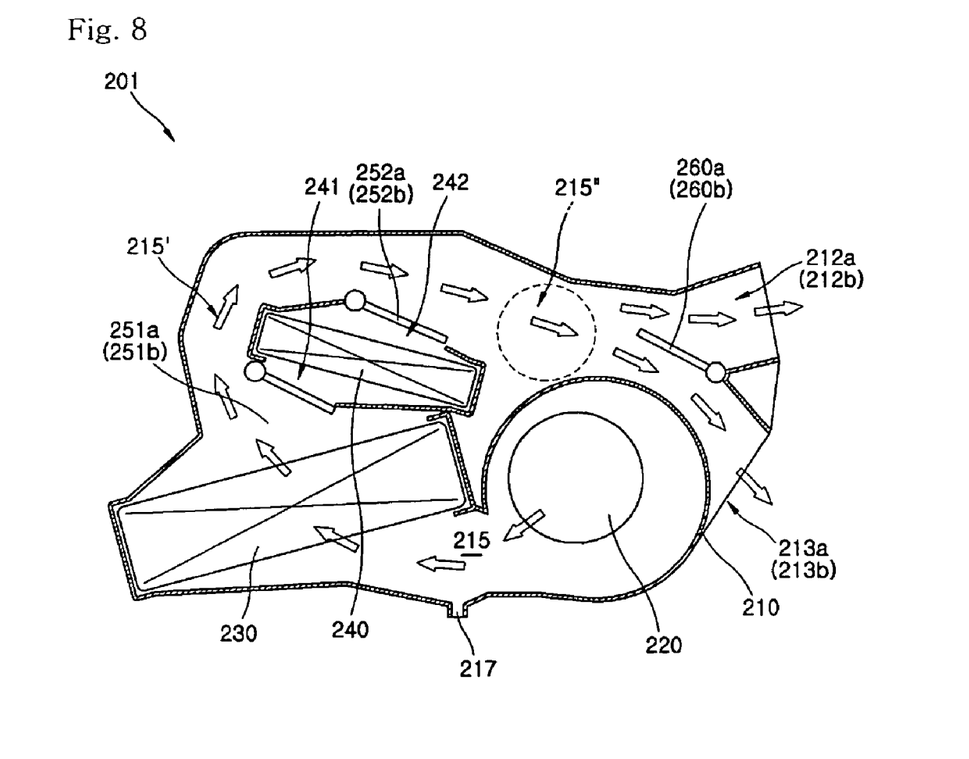
FIG. 8 is a sectional view of showing an air stream in a cooling mode in FIG. 6.

FIG. 8 depicts the air stream in the cooling mode. In the cooling mode the rear seat evaporator 230 operates according to the operation of the cooling device. At this time, the first rear seat temperature doors 251a and 251b close the upstream area portion 241 of the rear seat heater core 240, and the second rear seat temperature doors 252a and 252b close the downstream area portion 242 of the rear seat heater core 240.

Accordingly, the air that is supplied to the inside of the rear seat air conditioning casing 210 by the rear seat blower 220 is cooled, being passed through the rear seat evaporator 230 and after that, the cool air is sent to the bypass flow passage 215' that is formed by the separation of the rear seat heater core 240 from the inner wall of the rear seat air conditioning casing 210 by the guide of the first rear seat temperature doors 251a and 251b. Next, the air is sent to the air mixing area portion 215" and discharged by the guide of the second rear seat temperature doors 252a and 252b to the rear seat vent outlets 212a and 212b, the rear seat floor outlets 213a and 213b, or in the bi-level mode. In this case, in the vent cooling mode the air is discharged to the rear seat vent outlets 212a and 212b, and in the floor cooling mode the air is discharged to the rear seat floor outlets 213a and 213b.

Figure 9:
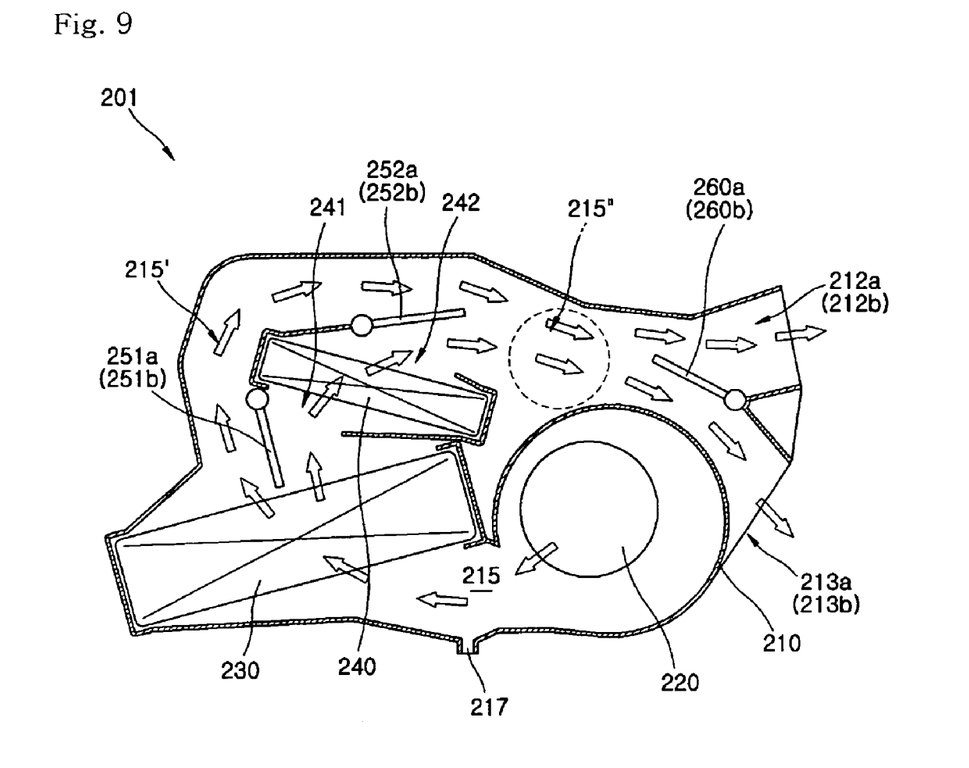
FIG. 9 is a sectional view of showing an air stream in a bi-level mode in FIG. 6.

FIG. 9 depicts the air stream in the cooling and heating bi-level mode. In the cooling and heating bi-level mode the cooling device operates to flow working fluids to the rear seat evaporator 230. At this time, the first rear seat temperature doors 251a and 251b do not completely open or close the upstream area portion 241 of the rear seat heater core 240 and the bypass flow passage 215', and the second rear seat temperature doors 252a and 252b do not completely open or close the downstream area portion 242 of the rear seat heater core 240 and the bypass flow passage 215'. In this case, the rear seat mode doors 260a and 260b do not open or close the air flow passages formed toward the rear seat vent outlets 212a and 212b and toward the rear seat floor outlets 213a and 213b.

As a result, a part of cool air passed through the rear seat evaporator 230 is passed through the rear seat heater core 240 and is then heated, and another part of cool air bypasses the rear seat heater core 240 to flow by the guide of the bypass flow passage 215' and is thus not heated. After that, by the guide of the second rear seat temperature doors 252a and 252b, the cool air that flows along the bypass flow passage 215' flows to the upstream of the air flow passage and is then discharged to the rear seat vent outlets 212a and 212b, and the warm air that is passed through the rear seat heater core 240 flows to the downstream of the air flow passage and is then discharged to the rear seat floor outlets 213a and 213b. In this case, when the degree of opening of the second rear seat temperature doors 252a and 252b are controlled, the air flow to the rear seat vent outlets 212a and 212b and the air flow to the rear seat floor outlets 213a and 213b are separated and discharged, not mixed in the air mixing area portion 215".

Thereby, the temperature of air discharged from the rear seat vent outlets 212a and 212b is different from that from the rear seat floor outlets 213a and 213b, and more particularly, the cooling and heating bi-level mode is successfully conducted such that cool air is discharged to the upper side portion of the rear seats inside the vehicle and warm air is discharged to the lower side portion thereof.

Figure 10:
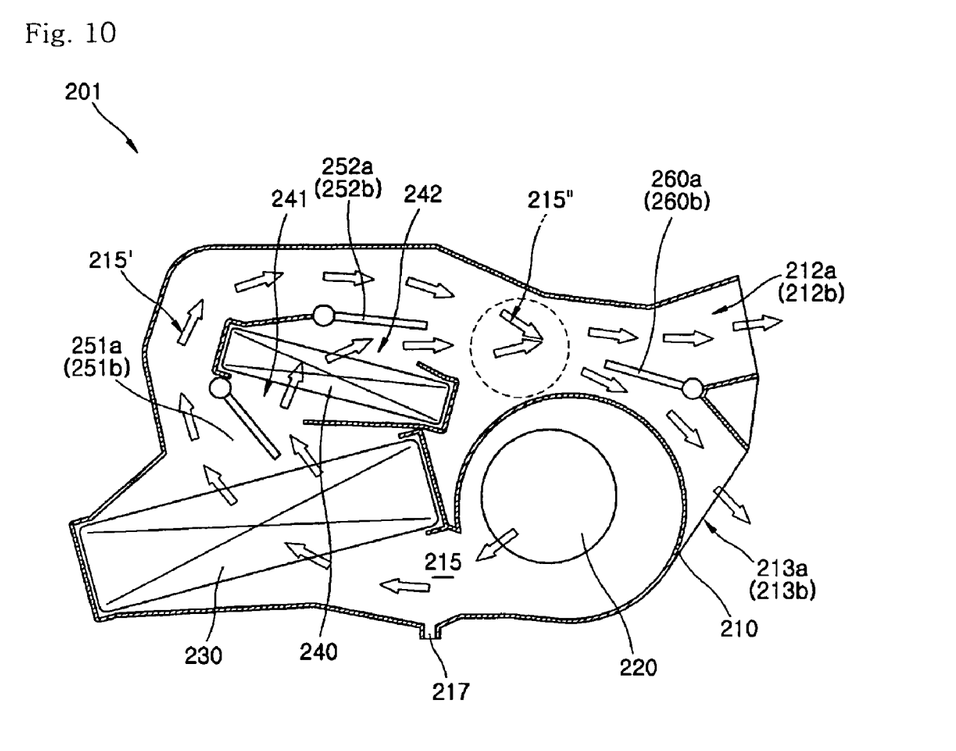
FIG. 10 is a sectional view of showing an air stream in an air mixture mode in FIG. 6.

FIG. 10 depicts the air stream in the air mixing mode. In the air mixing mode, the rear seat evaporator 230 operates or does not operate. At this time, the first rear seat temperature doors 251a and 251b do not completely open or close the upstream area portion 241 of the rear seat heater core 240 and the bypass flow passage 215', and the second rear seat temperature doors 252a and 252b do not completely open or close the downstream area portion 242 of the rear seat heater core 240 and the bypass flow passage 215'. Thus, a part of cool air passed through the rear seat evaporator 230 or a part of air having a surrounding temperature is passed through the rear seat heater core 240 and is then heated, and another part thereof bypasses the rear seat heater core 240 and is kept not heated. The air that is passed through the rear seat hater core 240 is mixed with the air that bypasses the rear seat heater core 240 in the air mixing area portion 215" by the guide of the second rear seat temperature doors 252a and 252b. In this case, the rear seat blower 220 is desirably placed between the second rear seat temperature doors 252a and 252b and the rear seat mode doors 260a and 260b, and in this case, since the rear seat blower 220 serves as a kind of protrusion, the cool air and the warm air are sufficiently mixed in the air mixing area portion 215".

The mixed air that is passed through the air mixing area portion 215" is discharged, by the guide of the rear seat mode doors 260a and 260b, to the rear seat vent outlets 212a and 212b, to the rear seat floor outlets 213a and 213b, or to both of the rear seat mode doors 260a and 260b and the rear seat vent outlets 212a and 212b.

As set forth in the foregoing, the air conditioner for the vehicle according to the present invention has the following advantages: first, in a bi-level mode air is discharged to the inside of the vehicle, and especially, a relatively low temperature of air is discharged to the upper side outlets of the rear seat air conditioning unit and a relatively high temperature of air is discharged to the lower side outlets thereof, thereby providing air of an optimum temperature to the occupants inside the vehicle.

Second, the rear seat blower is disposed adjacent to the air mixing area portion, and the rear seat evaporator and the rear seat heater core are located horizontally, thereby enabling the rear seat air conditioning unit to be compacted.

Third, the modes of air flowing to the left and right areas of the rear seat air conditioning casing are independently controlled, thereby successfully providing a four-way zone type air conditioner.

Finally, a variety of modes are controlled by using the rear seat mode doors mounted in the divided two areas of the rear seat air conditioning unit.

While the present invention has been described with reference to the particular illustrative embodiments, it is not to be restricted by the embodiments but only by the appended claims, and therefore, it is to be understood that other modifications and variations may be made without departing from the substance and scope of the present invention, as those skilled in the art will readily understand. Such alternate modifications and variations are within the scope of the present invention which is intended to be limited only by the appended claims and equivalents thereof.

What is claimed is:

1. An air conditioner for a vehicle comprising:
   a front seat air conditioning unit having a front seat air conditioning casing provided with a front seat evaporator and a front seat heater core disposed on air flow passages therein, with front seat vent outlets, front seat defrost outlets and front seat floor outlets disposed at an exit end thereof for discharging the air flowing to the front seats of the vehicle, with a front seat partition wall for dividing the air flow passages into two areas, with front seat temperature doors for individually controlling the temperatures of the two areas divided by the front seat partition wall, with front seat mode doors for controlling the degree of opening of the front seat vent outlets, the front seat defrost outlets and the front seat floor outlets, and with a front seat blower for blowing the air to the front seat air conditioning casing; and
   a rear seat air conditioning unit having a rear seat air conditioning casing provided with a rear seat evaporator disposed substantially in the horizontal direction to air flow passages therein, with a rear seat heater core disposed on the upper side of the rear seat evaporator, with rear seat vent outlets and rear seat floor outlets disposed at an exit end thereof for discharging the air flowing to the rear seats of the vehicle, with a bypass flow passage formed along an outer side of the rear seat heater core, with an air mixing area portion where the air passed through the rear seat evaporator is mixed with the air passed through the rear seat heater core, with a rear seat partition wall for dividing the air flow passages into two areas, with first rear seat temperature doors disposed between the rear seat evaporator and the rear seat heater core for opening and closing an upstream air flowing passage of the rear seat heater core and the bypass flow passage and for independently controlling the temperatures of the two areas divided by the rear seat partition wall, with second rear seat temperature doors for opening and closing a downstream air flow passage of the rear seat heater core, with rear seat mode doors for controlling the degree of opening of the rear seat vent outlets and the rear seat floor outlets, and with a rear seat blower for blowing the air to the rear seat air conditioning casing.

2. An air conditioner for a vehicle as claimed in claim 1, wherein the rear seat blower is disposed between the rear seat evaporator/the rear seat heater core at one side thereof and the rear seat vent outlets/the rear seat floor outlets at the other side thereof.

3. An air conditioner for a vehicle as claimed in claim 2, wherein the rear seat evaporator and the rear seat heater core are disposed substantially in the horizontal direction at the one side of the rear seat blower.

4. An air conditioner for a vehicle as claimed in claim 1, wherein the degree of opening of the rear seat vent outlets and the rear seat floor outlets of the rear seat air conditioning casing is controlled by each of the rear seat mode doors mounted in the divided two areas.

5. An air conditioner for a vehicle as claimed in claim 1, wherein the rear seat blower is formed at one side thereof protrudingly inwardly from the rear seat air conditioning casing to compact the air mixing area portion.

6. An air conditioner for a vehicle as claimed in claim 1, wherein the second rear seat temperature doors, in response to the control of the degree of opening thereof, are adapted to separate the warm air passing through the rear seat heater core and the cool air bypassing the rear seat heater core to supply the warm air to the rear seat floor outlets and the cool air to the rear seat vent outlets respectively, or to mix the warm air and the cool air in the air mixing area portion to supply the mixed air to the rear seat vent outlets and the rear seat floor outlets.

* * * * *